Jan. 19, 1960   K. RÄNTSCH ET AL   2,921,374
COMBINED MEASURING, NUMBERING AND READING DEVICE
Filed Sept. 30, 1957   6 Sheets-Sheet 1

Inventors
KURT RÄNTSCH
LUDWIG FAUST
By Toulmin & Toulmin
Attorneys

Jan. 19, 1960 K. RÄNTSCH ET AL 2,921,374
COMBINED MEASURING, NUMBERING AND READING DEVICE
Filed Sept. 30, 1957 6 Sheets-Sheet 2
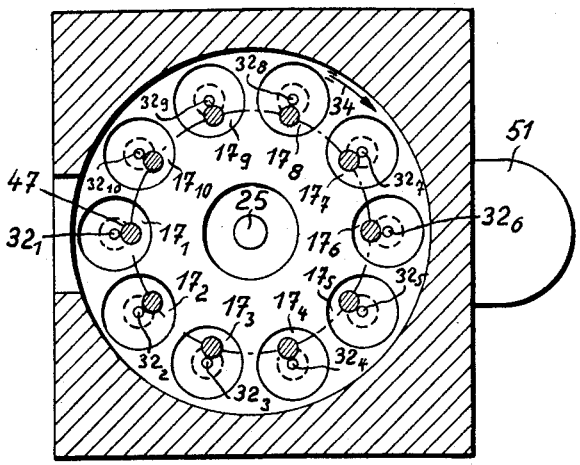
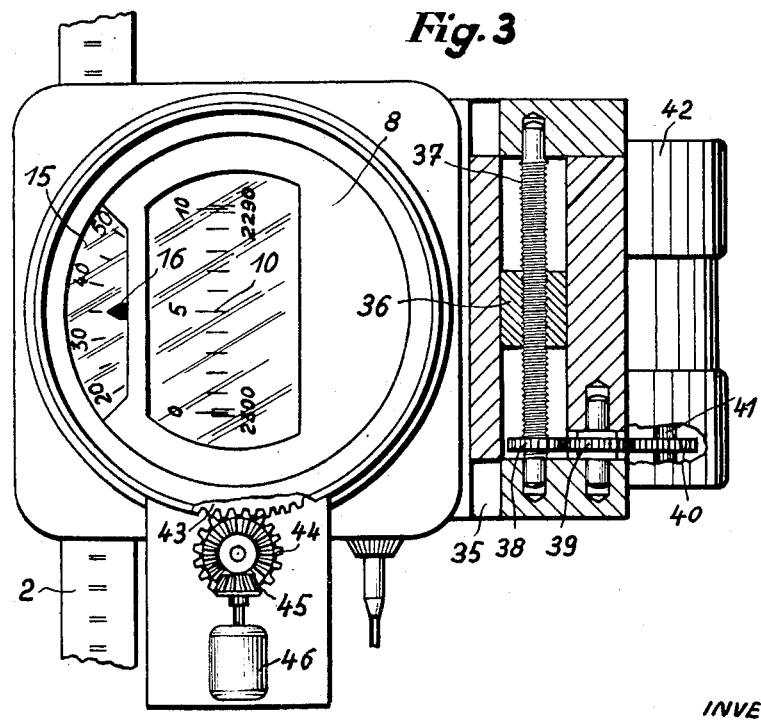
INVENTORS
KURT RÄNTSCH
LUDWIG FAUST Jan. 19, 1960     K. RÄNTSCH ET AL     2,921,374
COMBINED MEASURING, NUMBERING AND READING DEVICE
Filed Sept. 30, 1957                           6 Sheets-Sheet 5

INVENTORS
KURT RÄNTSCH
LUDWIG FAUST
By Taulmin & Taulmin
Attorneys

Jan. 19, 1960  K. RÄNTSCH ET AL  2,921,374
COMBINED MEASURING, NUMBERING AND READING DEVICE
Filed Sept. 30, 1957  6 Sheets-Sheet 6

INVENTORS
KURT RÄNTSCH
LUDWIG FAUST
By Taubman & Taubman
Attorneys

United States Patent Office 2,921,374
Patented Jan. 19, 1960

2,921,374

COMBINED MEASURING, NUMBERING AND READING DEVICE

Kurt Räntsch, Wetzlar, and Ludwig Faust, Braunfels, Germany, assignors to M. Hensoldt & Sohne, Optische Werke Aktiengesellschaft, Wetzlar, Germany Application September 30, 1957, Serial No. 687,186

Claims priority, application Germany September 29, 1956

17 Claims. (Cl. 33—125)

The present invention relates to measuring apparatus. More in particular, the present invention relates to a combined measuring, numbering and reading device especially for use with machine tools.

It is known in the art to provide machines, particularly machine tools, with a measuring scale, having numbered division strokes and being mounted on a working table of the machine. If a work piece has to be tooled at several locations removed from each other by a certain distance indicated in a workshop blueprint or drawing, the machine table is displaced successively by the requisite distance which is measured by the measuring scale. This process is complicated inasmuch as each successive displacement after the first displacement does not start at zero but at the reading point of the previous displacement and therefore has to take into account the previous displacement. A calculation is therefore required in order to obtain the reading of the accurate displacement, taking into account the value of the required displacement, the previous displacement, and the nominal value at the reading point on the scale. This calculation is time-consuming and frequently the cause of errors. As a result, many of the tooled work pieces have to be rejected.

Furthermore, it is expensive to engrave numbers on measuring scales and complicated and expensive machinery is required for this engraving.

There have already been proposed measuring devices in which a measuring slide is provided with a counter indicating the distance-value of the displacement of the slide (see, for example, the German patent to Kestler Serial No. 889,989). However, these devices do not have an unnumbered scale and are unsatisfactory since they do not work with the desirable degree of accuracy. For example, slight faults of the transmission gear between the slide and the counter result in an incorrect measured value of the counter.

It is an object of the present invention to provide a combined measuring, numbering and reading device for use with machines and machine tools, which assures an uncomplicated, reliable and accurate measuring operation.

It is another object of the present invention to provide a combined measuring, numbering and reading device for use with machines and machine tools, which assures more accurate and at the same time faster measurements and which avoids errors and reduces the quantity of rejected material.

It is a further object of the invention to provide a combined measuring, numbering and reading device for use with machines and machine tools, which permits the use of an unnumbered measuring scale.

It is yet another object of the present invention to provide a combined measuring, numbering and reading device for use with machines and machine tools, in which the numbers which are attributed by the device to the division strokes of an unnumbered measuring scale comprised therein, can be reset to zero independently from the scale and at any position of the latter.

These objects are achieved by the combined measuring, numbering and reading device according to the invention which comprises a displaceable measuring scale the division strokes of which are unnumbered per se, but are provided with numbers with the aid of an independently adjustable numbering device comprising at least one counter which is coupled to the displaceable scale and attributes numbers to the division strokes on the scale and means for projecting on a reading window at least one of the strokes of the scale, and for projecting the pertinent numbers of the counter of the counters adjacent to the strokes in the same window.

According to another important feature of our invention, the numbering device in the above-described combination can be reset to zero independently of the relative position of the unnumbered measuring scale.

There can be provided several counters alternatingly providing numbers for the strokes of the scale, and preferably there are provided ten counters, each of which numbers every tenth division stroke of the scale, and in which the two last index numbers of each counter remain constant.

There can also be provided additional scales for fine measurements which are also equipped with means for resetting these scales to zero independently from the position of the coarse scale.

According to a preferred embodiment of the present invention the numbers for the division strokes of the scale are provided by a rotatable and axially displaceable drum upon the periphery of which there are arranged in helical succession the figures for numbering the strokes of the scale.

The drum is also equipped with means for resetting the same to zero independently from the position of the scale.

The combined measuring, numbering and reading device of the present invention is less expensive than measuring devices having numbered scales, since the time-consuming and costly process of engraving numbers on the scales is dispensed with.

With the combined measuring, numbering and reading device of the present invention much more accurate measured values are obtained than with the known measuring slides and counters described hereinbefore.

The invention will be better understood upon the following detailed description thereof and a comparison with the state of the art made in connection with the accompanying drawings, wherein Figure 1 is a longitudinal sectional view of one embodiment of the combined measuring, numbering and reading device of the present invention;

Figure 2 is a sectional view of the combined measuring, numbering and reading device of the present invention taken along the lines II—II of Figure 1;

Figure 3 is a plan view, partly in section, of the embodiment of the numbering, measuring and reading device of the present invention shown in Figures 1 and 2;

Figure 1:
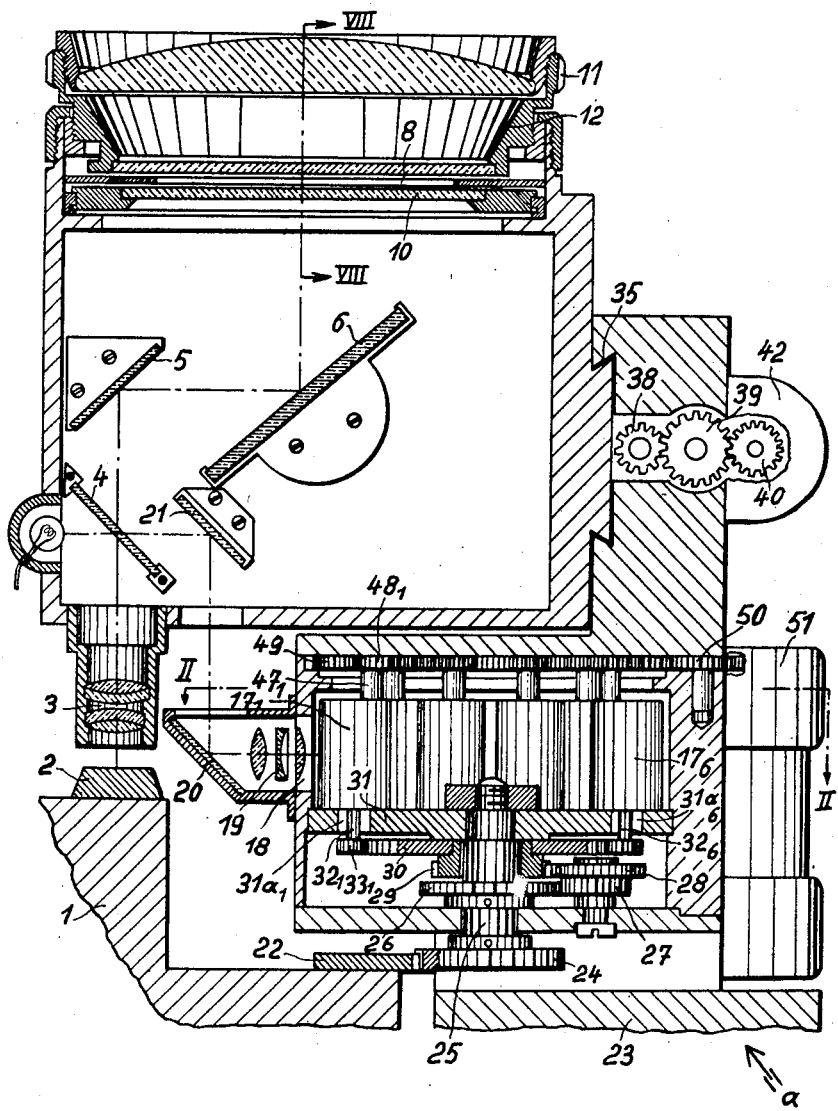
Figure 4:
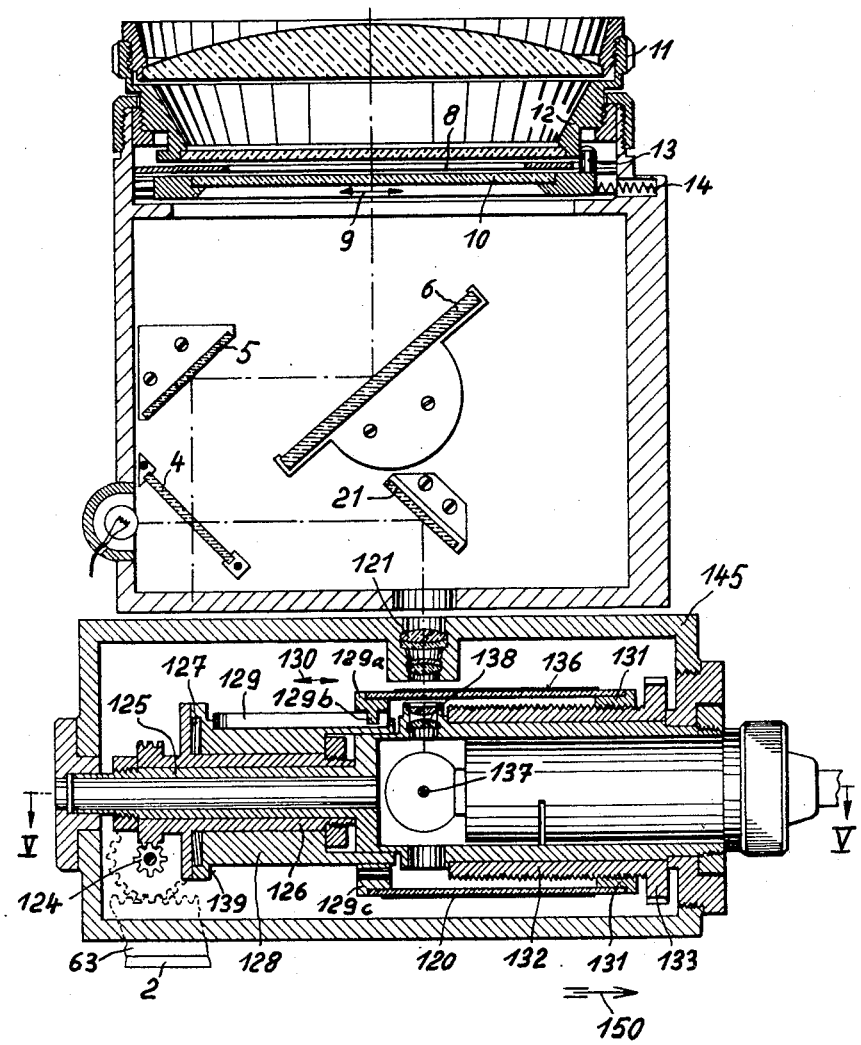
Figure 4 is a longitudinal sectional view of a preferred embodiment of the combined measuring, numbering and reading device of the present invention.
Figure 5:
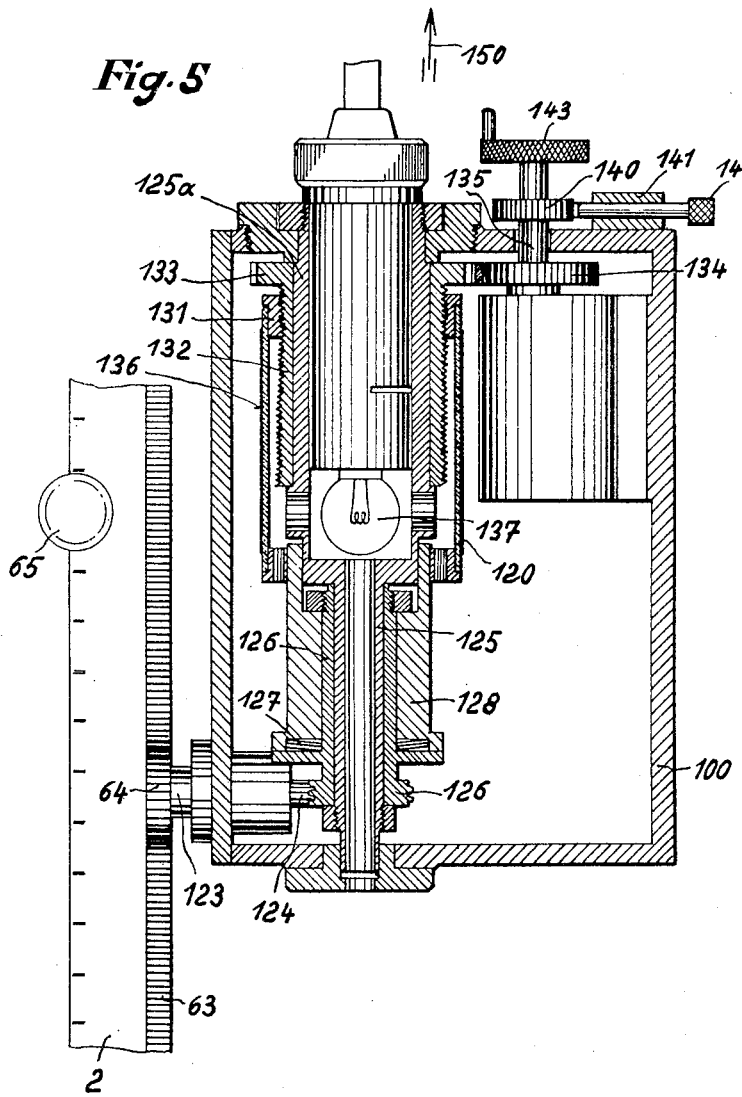
Figure 5 is a sectional view of a preferred embodiment of the combined measuring, numbering and reading device of the present invention taken along the lines V—V in Figure 4.

Referring now to the drawings somewhat more in detail, the coarse centimeter scale 2 is fixedly connected to the displaceable machine bench 1. The scale 2 is provided with unnumbered double strokes, two of which can be seen in Figure 3.

The different double strokes of the scale 2 are provided with numbers by a separate counting and reading device $a$. A rack 22 is fixedly connected to the machine bench 1 bearing the coarse scale 2. The reading device $a$ is mounted on the stationary portion 23 of the machine frame. A gear 24 mounted upon a shaft 25 engages the rack 22. The shaft 25 also bears a gear 26 turning together with gear 24. Gear 26 is engaged by a gear 27 fixedly connected with gear 28, the latter engaging gear 29 which, in turn, is rotatably mounted upon shaft 25. The shaft 25 bears a disk 31 upon which there are fixedly mounted ten counters $17_1$, $17_2$, $17_3$, $17_4$, $17_5$, $17_6$, $17_7$, $17_8$, $17_9$, $17_{10}$. The disk 31 has borings $31a_1$, $31a_2$, $31a_3$, $31a_4$, $31a_5$, $31a_6$, $31a_7$, $31a_8$, $31a_9$, $31a_{10}$ and the drive shafts $32_1$, $32_2$, $32_3$, $32_4$, $32_5$, $32_6$, $32_7$, $32_8$, $32_9$, $32_{10}$ of the counters $17_1$, $17_2$, $17_3$, $17_4$, $17_5$, $17_6$, $17_7$, $17_8$, $17_9$, $17_{10}$ pass through these borings. At the respective ends of the shafts 32 there are mounted gears 33 engaging the gear 30 which, in turn, is fixedly connected to gear 29.

Since the rack 22, the scale 2 and the bench 1 are displaceable while the reading device $a$ is mounted on the fixed portion 23 of the machine frame, the movement of the machine bench with the scale and the rack is transferred to the counters via the gear system which has just been described, and the operation of which will be described in greater detail further below.

Each of the counters $17_1$ to $17_{10}$ has another shaft $47_1$, $47_2$, $47_3$, $47_4$, $47_5$, $47_6$, $47_7$, $47_8$, $47_9$, $47_{10}$, respectively, each of which shafts bears a gear $48_1$, $48_2$, $48_3$, $48_4$, $48_5$, $48_6$, $48_7$, $48_8$, $48_9$, $48_{10}$, respectively, engaging the interior toothed surface of the gear ring 49. A gear 50 driven by a motor 51 engages the outer toothed surface of the gear ring 49. The counters can thus be reset to zero in a manner described in detail further below.

Instead of placing the numbers of the counters on the surface of the scale 2 itself, both the unnumbered strokes of the scale 2 and the numbers obtained from the counters $17_1$ to $17_{10}$ can be projected onto a common plane, as, for example, the reading window 8, so as to produce the image of a numbered scale. The projection means for the scale comprises an objective lens system 3, a semi-translucent mirror 4 and wholly specular mirrors 5 and 6. The means for projecting a figure of the counters $17_1$ to $17_{10}$ appearing behind a window 18 (in Figure 1, the counter $17_1$ appears behind the window 18) comprises an objective lens system 19, mirrors 20, 21, a semi-translucent mirror 4 and the wholly specular mirrors 5 and 6.

In addition to the coarse scale 2 there is preferably provided a pair of scales for fine measurements. The scale 10 is arranged underneath the reading window 8 and can be moved in the directions indicated by the arrow 9. This scale 10 subdivides one interval, i.e. one centimeter, of the coarse scale 2 projected on the reading window 8 into ten equal intervals and thus indicates millimeters. Scale 10 is under the influence of a preessure spring 14 and bears a pin 13. The scale can be displaced in the directions indicated by the arrow 9 by turning a knurl ring 11 bearing an eccentric ring 12 which latter acts upon the pin 13 of the scale 10.

Furthermore, the knurl ring 11 is connected to another, circular scale 15. The turning of the knurl ring can be read from the scale in cooperation with the pointer 16. The circular scale is subdivided into 100 equal intervals. Upon turning the scale 15 from 0 to 100 the millimeter scale 10 has moved by one millimeter relative to the centimeter strokes of the coarse scale 2 and the scale 15 thus indicates the one hundredths of millimeters.

In the embodiment of the invention shown in Figures 1 to 3 which comprises fine scales in addition to the coarse scale 2, means are provided for resetting the scales 10 and 15 to zero. A part of the reading device comprising the objective lens system 3, the mirrors 4, 5, 6 and the reading window 8, can be displaced in a dovetail guide recess 35 by a nut 36 and a spindle 37. The spindle 37 communicates with intermeshing gears 38, 39, 40, with the gear 40 being mounted upon the shaft 41 of a motor 42.

The means for resetting to zero the scale 15 comprise a gear ring 43 on the periphery of the knurl ring 11. A gear 44 is connected to the motor 46 via a bevel gear 45. The gear 44 also engages the gear ring 43.

Another embodiment of the reading device of the present invention is shown in Figures 4 to 7 of the drawings. The coarse and fine scales as well as the means for resetting the fine scales to zero and the projection means are substantially similar to those shown in Figures 1 to 3 and described further above. However, according to the embodiment of Figures 4 to 7, the ten counters $17_1$ to $17_{10}$ have been replaced by a different, improved numbering arrangement.

The numbers for the unnumbered scale 2 are obtained from a drum 120 which is preferably hollow and consists of translucent material as, for instance, organic glass and which can be rotated and displaced longitudinally.

The rack 63 of the scale 2 intermeshes with the pinion 64. The pinion is mounted upon one end of a drive shaft 123, the other end of which bears a worm gear 124, which worm gear engages a bush 126 positioned around a shaft 125. The bush 126 is disengageably connected to the one end of an intermediate sleeve 128 via a slide clutch 127. As long as the clutch is engaged, the intermediate sleeve 128 is thus turned by a displacement of the scale 2 with its rack 63, via the pinion 64, the drive shaft 123, the worm gear 124 and the bush 126.

The drum 120 is slidably connected to the intermediate sleeve 128 and is rotatable therewith. For that purpose the intermediate sleeve 128 is provided with a longitudinally extending guide slot 129 for the drum 120. The latter has a sleeve 129a mounted on one end (in Figure 4 the extreme left end) of the drum and having a nose portion 129b, which nose portion is adapted to slide in the longitudinal guide slot 129. The other, inner portion of the sleeve 129a rests upon the intermediate sleeve 128 as at 129c. The drum 120 thus rotates in conjunction with the intermediate sleeve 128 and can be moved longitudinally relative to the latter in the directions indicated by the arrow 130 in Figure 4. In its extreme end position reached after a longitudinal displacement, the drum 120 comes to rest against a protruding portion 139 of the intermediate sleeve 128.

At its extreme end opposite to the end bearing the sleeve 129a, the drum 120 has a threaded collar portion 131 engaging a threaded sleeve 132. The threaded sleeve 132 rests upon the hollow shaft 125a and bears a gear 133, which latter engages a gear 134 which, in turn, is mounted upon a drive shaft 135. The shaft 135 bears another gear 140. Upon that portion of the casing 100 of the reading device neighboring the shaft 135 there is mounted a guide socket 141 receiving a claw 142. This claw 142 is adapted to lock the gear 140, thereby arresting the shaft 135. A handwheel 143 is also mounted upon the drive shaft 135.

The drum 120 consists of a cylindrical body of translucent material as, for instance, organic glass. A transparent plastic sheet 136 (see Figure 6) is wrapped around the periphery of the drum 120 and is attached, e.g. glued, thereupon. Various numbers used for numbering the scale 2 are printed on the plastic sheets in a manner schematically indicated in Figure 6, wherein the figures are symbolized by horizontal dashes. A light source 137 is disposed inside of the drum 120, and a condenser 138 illuminates the number on the drum 120 appearing below the objective lens system 121.

The means for projecting this number upon the reading window 8 comprise the objective lens system 121, mounted in the frame 145, the mirrors 21, 4, 5, and 6. The means for projecting on the reading window 8 a portion of the scale 2 with at least one double stroke comprise the objective lens system 65 (schematically indicated in Figure 5), the semitranslucent mirror 4 and the mirrors 5 and 6.

Operation

Whenever the machine bench 1 and the scale 2 are moved, the division strokes of the scale 2 can be seen one after another moving along the reading window 8 of the reading device. The rack 22 moves simultaneously with the machine bench 1 and the scale 2, and the motion of the rack is transferred to the disk 31 via the gear 24 and the shaft 25. The disk 31 is thus caused to rotate and the counters $17_1$, $17_2$, $17_3$, $17_4$, $17_5$, $17_6$, $17_7$, $17_8$, $17_9$, $17_{10}$ pass in succession behind the window 18. The gear 24 and the shaft 25 also actuate the gears 26, 27, 28, 29, 30 and thereby the gears $33_1$, $33_2$, $33_3$, $33_4$, $33_5$, $33_6$, $33_7$, $33_8$, $33_9$, $33_{10}$ are rotated, which, in turn, revolve the central shafts $32_1$, $32_2$ ... $32_{10}$ of the counters $17_1$, $17_2$ ... $17_{10}$. Consequently, the displacement of the scale 2 results in a corresponding change of the figures obtained of the counters $17_1$, $17_2$ ... $17_{10}$.

The transmission between the rack 22 and the gear 30 is so chosen that the gear 30 on the one hand and the disk 31 on the other hand move at angular speeds having a ratio of 10:9. Hence, the disk 31 has completed a full rotation while the gear 30 has completed nine tenths of a full rotation only.

Furthermore, the transmission ratio between the gear 30 and the gears 33 is so chosen that a full rotation of the disk 31 results in a revolving motion of the counter $17_1$ by one hundred units. At the beginning and at the end of one full rotation of the disk 31 the counter $17_1$ is behind the window 18 while in the meantime the other nine counters have passed the window. During the rotation ten centimeter strokes of the scale 2 have passed through the reading window 8. Consequently, each of the ten counters $17_1$, $17_2$ ... $17_{10}$ numbers every tenth centimeter stroke of the scale 2 with a figure exceeding the preceding figure by one hundred. These figures indicate millimeters.

For example, if the disk 31 has performed one tenth of a full rotation in the direction of the arrow 34 (see Figure 2), the counter $17_2$ has taken the place of the counter $17_1$ and now appears behind the window 18. The counter $17_2$ indicates a figure exceeding the figure which had been indicated by the counter $17_1$ by the amount of ten. If the disk 31 has completed the second tenth of a full rotation the counter $17_3$ replaces the counter $17_2$, again showing a figure exceeding the previous figure shown by the counter $17_2$ by the amount of ten, and so forth, until, after a complete rotation of the disk 31 the counter $17_1$ reappears behind the window 18, showing a figure higher by the amount of one hundred than the amount shown during its preceding appearance. Each of the next following counters shows a number which is higher by the amount of ten compared to the figure shown by the preceding counter, and consequently, each of the strokes of the scale 2 appearing in the reading window 8 is provided with a number exceeding the preceding stroke by ten units.

Figure 3 shows, for example, two double strokes of the scale 2 which are projected on the reading window 8. One of the strokes is provided with the number 2290 while the next following stroke has the number 2300, which figures are obtained from two of the counters passing behind the window 18, and are then projected on the reading window 8 via the objective 19 and the mirrors 20, 21, 4, 5, 6.

Since each of the counters $17_1$, $17_2$ ... $17_{10}$ is switched by one hundred units at the occasion of each passage behind the window 18, the last two index numbers remain constant and it is unnecessary to impel the corresponding elements of the counters. The transmission between the gears 30 and 33 can be chosen accordingly.

A reading of a measured value is obtained in the following manner:

At least one double stroke marking a division of the coarse scale 2 appears and remains in the reading window 8 after the scale 2 has completed its movement relative to the reading device and has come to rest.

This double stroke is projected onto the reading window 8 through the objective lens system 3, the semitranslucent mirror 4 and the deviating mirrors 5 and 6. A figure of one of the ten counters (for example the Figure 2300) is projected through the window 18, the objective lens system 19, the mirrors 20, 21, the semitranslucent mirror 4 and the entirely specular mirrors 5 and 6 and appears on the reading window 8 adjacent to one of the double strokes of the coarse scale 2.

Usually, none of the strokes of the fine scale 10 will be accurately positioned between the two marks of the double strokes. This position can then be attained by turning the knurl ring 11 and thereby displacing the scale 10 through the eccentric ring 12 and the pin 13 until one of the strokes of the fine scale is accurately positioned upon the central axis of the double stroke. In Figure 3 of the drawings the stroke zero of the fine scale 10 has so been adjusted relative to the double stroke number 02300 of the coarse scale appearing upon the reading window 8. The length of the displacement of the scale 10 by the knurl ring 11 appears on the fine circular scale 15 which is connected to the knurl ring 11. The reading point on the scale 15 is indicated by the pointer 16. In the example illustrated in Figure 3 a measured value of 02300, 35 millimeters is thus obtained.

After each reading both the numbers of the coarse scale and the reading device comprising the fine scales 10 and 15 have to be reset to zero, before a new measuring operation can be commenced. This resetting operation is facilitated by the three motors 46, 42, and 50 and the accompanying structure described further above. The operation thereof is as follows:

The motor 46 is put into operation and then actuates the bevel gear 45 and turns the knurl ring 11 via the gear 44 and the toothed ring 43, until the pointer 16 indicates zero upon the scale 15. The motor 46 is then switched off, and the motor 42 is switched in in order to reset to zero the scale 10 which had been displaced by the resetting of the scale 15 relative to the double strokes of the coarse scale 2 because of the interconnection of the scale 10 with the scale 15 due to which the scale 10 is moved by the amount of 1 millimeter upon each full rotation of the scale 15. The motor 42 now actuates the nut 36 via the shaft 41, the gears 40, 39, 38, and the spindle 37, thereby moving along the dovetail recess 35 that portion of the reading device comprising the objective lens system 3, the mirrors 4, 5, 6, and the reading window 8. The motor 42 is kept in operation and the displacement along the dovetail recess is continued until the scale 10 has reached a position in which the zero stroke of the scale 10 coincides with the central axis of one of the double strokes of the scale 2 appearing upon the reading window 8.

Finally, the motor 51 is put in operation. The motor 51 moves all counters $17_1$, $17_2$ . . ., $17_{10}$ via the gear 50, the gear ring 49 and the gears 48 until one of the counters shows the number zero behind the window 18 and this number has been put under the double stroke relative to which the zero stroke of the scale 10 had been centered previously. The resetting to zero of the scale 2 and the reading device, specifically the scales 10 and 15 is thereby completed and a new measurement can be initiated by displacing the machine bench 1 with the scale 2.

The embodiment of the invention shown in Figures 4 to 7 of the drawings operates in the following manner:

A displacement of the scale 2 and the corresponding rack 63 causes a rotation of the drum 120 via the pinion 64, the drive shaft 23, the worm gear 124, the shaft 125, the bush 126 and the intermediate sleeve 128. Simultaneously with this rotation the drum moves longitudinally in the direction of the arrow 150 (Figures 4, 5) with its thread 31 upon the threaded sleeve 132, since the latter is held stationary by the claw 142 engaging and arresting gear 140, hence shaft 135, gear 134 and 133. As soon as the scale 2 comes to a rest, the drum 120 also ceases its rotational and longitudinal movement and the pertinent number of the sheet 136 around the drum appears under the objective lens arrangement. From there, an image of this number is projected on the reading window 8 via the objective lens system 121 and the mirrors 21, 4, 5, 6. The number is projected under the double stroke of the scale 2 which is projected on the reading window 8 via the objective lens 65 and the mirrors 4, 5, 6.

Figure 6:
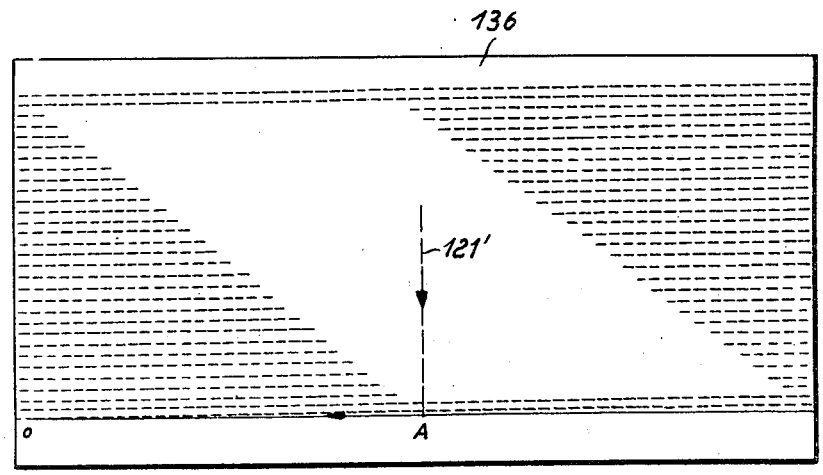
Figure 6 is a plan view of the plastic sheet bearing the figures for numbering the division strokes of the scale in the embodiment shown in Figures 4 and 5, which plastic sheet has been cut transversely and unwound from the drum.
Figure 7:
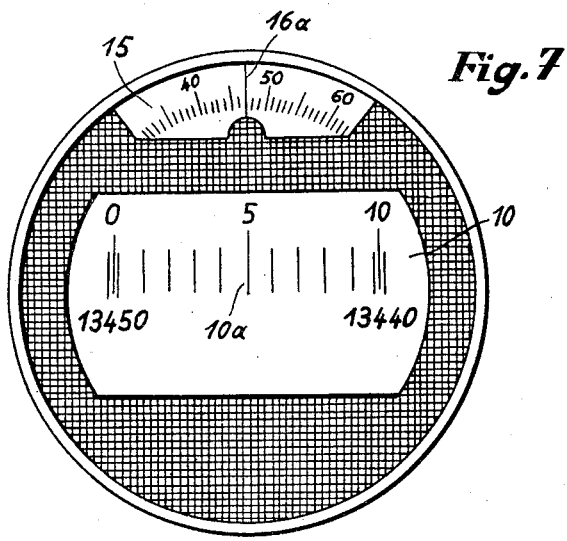
Figure 7 is a plan view of the reading window of the embodiment shown in Figures 4 to 6.
Figure 8:
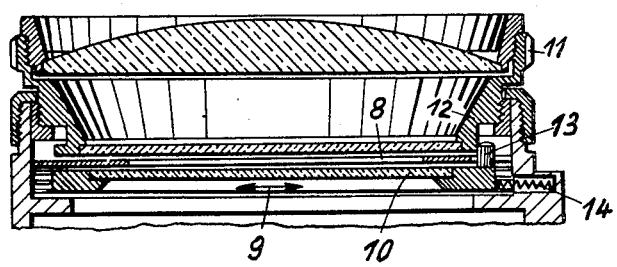
Figure 8 is a cross-sectional view taken along the lines VIII—VIII in Figure 1 and illustrates the reading device-portion of the combined measuring, numbering and reading device of the present invention.

After the reading of the measurement has been done, the drum 120 has to be reset to zero prior to starting a new measurement. For that purpose, the claw 142 is disengaged from gear 140 and the handwheel 143 is turned. Thereby, the threaded sleeve 132 is rotated, too, via the shaft 135 and the gears 134, 133. The drum 120, however, cannot rotate together with sleeve 132, since the intermediate sleeve 128 and the other transmission elements to the rack 3, which remain in their respective resting positions tend to hold drum 120 stationary. Due to the rotation of the threaded sleeve 132 the drum 120 is moved longitudinally in the direction opposite to the arrow 150, with the nose portion 129b sliding along the guide slot 129. By this longitudinal movement of the drum 120 the optical axis of the objective lens system 121 mounted in the frame 145 is displaced in the direction of the arrow 121' (Figure 6). As soon as the optical axis 121' has reached the point A, the drum 120 is brought to rest against the protruding portion 139 of the intermediate sleeve 128. If the threaded sleeve is continued to be turned, the drum is firmly pressed against the protruding portion, until the resistance of the slide clutch 127 is overcome. The drum 120 now turns together with the intermediate sleeve 128 and the threaded sleeve 132 until the optical axis 21 has reached the figure zero on the drum. 0 is then projected on the reading window 8 instead of, for example, the figure 13440 (Figure 7) and the turning of the handwheel 143 is stopped, and a new measurement can be started.

The resetting operation just described does not involve the scale 2 since the intermediate sleeve is connected to the worm gear 124 via the slide clutch 127. Consequently, the pinion 124 is not turned, the rack 3 remains stationary and the double strokes of the scale projected on the reading window (Figure 7) remain where they are.

In the embodiment just described the measuring operation is effected by moving the scale relative to the work piece to be measured. It is, however, also possible, to have a stationary scale and to displace the reading device together with the work piece in a manner known per se. It is advisable to do that in case the scale 72 is very long.

Figure 9:
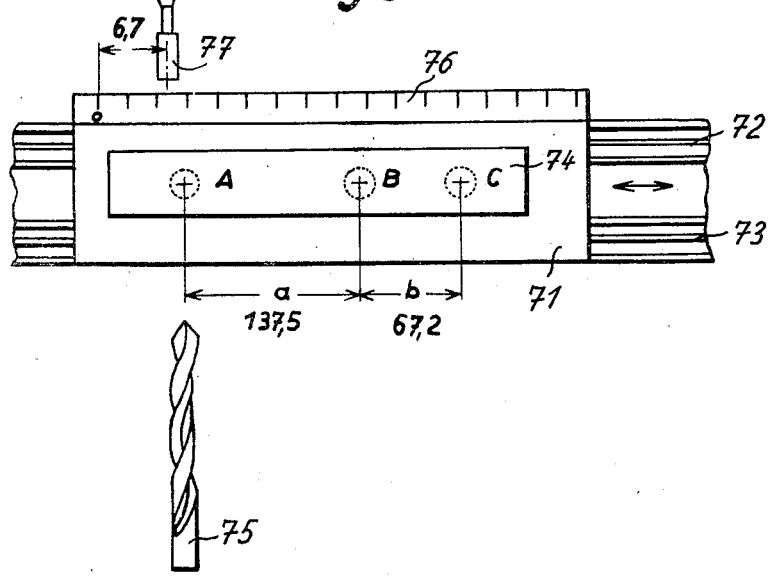
Figure 9 is schematic view of a portion of a machine table, a work piece and measuring scale and illustrates the advantages of the device of the present invention in comparison with known measuring devices.

The advantages of the combined measuring, numbering and reading device of the present invention over the arrangements known in the art shall now be explained with the aid of Figure 9 which shows schematically a machine table 71 displaceable on guide rails 72 and 73. A work piece 74 is disposed on the machine table 71. The machine table 71 is connected to a scale 76 bearing a number of division marks. A stationary reading device 77 is arranged above the scale 76. It is assumed that the work piece has to be provided with bores A, B, C (produced e.g. by a drill such as drill 5), and that the distance between the bores A and B be $a=137.5$ millimeters and the distance between the bores B and C be 67.2 millimeters.

In known arrangements the scale 76 is provided with numbers, and the measuring operation is as follows: The table 1 is displaced until point A of the workpiece 74 is located exactly below the drill. Simultaneously with the movement of the machine table 71 the scale 76 has been displaced relative to the reading device 77, and a measured value of 6.7 millimeters is read therefrom.

In this position the bore A is then drilled into the workpiece. The machine table is then displaced by the distance of 137.5 millimeters. The workman has to add this amount to the value of the initial displacement of 6.7 millimeters, making a total of 143.5 millimeters. This value must appear in the reading device 77 and then the bore B is drilled into the workpiece 74. Finally, the figure 67.2 millimeters has to be added to the figure 143.5 millimeters and the table 71 has to be moved until there appears in the reading device the value 211.4 millimeters. In this position, the bore C is drilled into the workpiece.

These calculations are the source of many errors and valuable time is lost, particularly if these calculations have to be done by workmen who are generally unable to do these additions without resorting to writing.

According to the invention, the scale 76 is unnumbered and coupled to counters the figures of which appear in the reading device adjacent to the division marks of the scale. The measuring operation with the combined device of the invention is much easier and more reliable. The table 71 is first displaced until the point A is situated exactly below the drill. The device is then reset from 6.7 to zero. The table, which is again displaced, is in the accurate position with the drill above point B as soon as the reading device indicates the number 137.5. No addition is required. The device can again be reset to zero and point C is reached as soon as the reading device indicates 67.2. Again, no calculation is required.

It will be understood that this invention is susceptible to modification in order to adapt it to different usages and conditions, and, accordingly, it is desired to comprehend such modifications within this invention as may fall within the scope of the appended claims.

What we claim is:

1. A combined measuring, numbering and reading device for use with machine tools, comprising, in combination, at least one counter, an unnumbered measuring scale bearing a plurality of marks for measuring lengths, and coupling means connecting said counter and said measuring scale adapted for displacing said scale and said counter relative to each other, said counter being adapted for numbering the marks of said measuring scale dependent on the relative displacement between the latter and said counter, a reading device comprising a reading window, projection means for projecting a portion of said scale on said reading window and projecting means for projecting numbers of said counter on said reading window, said reading window thus showing a portion of a numbered scale, and means for resetting to zero said counter independently of the position of said measuring scale relative thereto.

2. A combined measuring, numbering and reading device for use with machine tools, comprising, in combination, at least one counter, an unnumbered measuring scale bearing a plurality of marks for measuring lengths, and coupling means connecting said counter and said measuring scale adapted for displacing said scale and said counter relative to each other, said counter being adapted for numbering the marks of said measuring scale dependent on the relative displacement between the latter and said counter, and a reading device comprising a reading window, projection means for projecting a portion of said scale on said reading window and projection means for projecting numbers of said counter on said reading window, said reading window thus showing a portion of a numbered scale, fine measuring means associated with said measuring scale for subdividing the interval between adjacent marks on said measuring scale, means for resetting to zero said counter independently of said measuring scale relative thereto and means for resetting to zero said fine measuring means.

3. A combined measuring, numbering and reading device for use with machine tools, comprising, in combination, a plurality of counters, an unnumbered measuring scale bearing a plurality of marks for measuring lengths, and coupling means connecting said counters and said measuring scale adapted for displacing said scale and said counters relative to each other, said counters being adapted for successively numbering the marks of said measuring scale dependent on the relative displacement between the latter and said counters, and a reading device comprising a reading window, projection means for projecting a portion of said scale on said reading window and projection means for projecting numbers of said counters on said reading window, said reading window thus showing a portion of a numbered scale.

4. A combined measuring, numbering and reading device for use with machine tools, comprising, in combination, an unnumbered measuring scale bearing a plurality of marks for measuring lengths, a rack moving together with said scale, a plurality of rotatable counters adapted for successively numbering the marks of said measuring scale dependent on the relative displacement between the latter and said counter, a rotatable disk supporting said counters, an assembly of transmission gears coupling said rack with said rotatable disk, a driving gear for rotating said counters on said rotatable disk, a second assembly of transmission gears coupling said rack with said driving gear, the angular speed of said driving gear being unequal to the angular speed of said disk, and means for resetting to zero said counters independently of said scale and said rack, and a reading device comprising a reading window, projection means for projecting a portion of said scale on said reading window and projection means for projecting numbers of said counters on said reading window, said reading window thus showing a portion of a numbered scale.

5. A combined measuring, numbering and reading device for use with machine tools, comprising, in combination, an unnumbered measuring scale bearing a plurality of marks for measuring lengths, a rack moving together with said scale, ten rotatable counters adapted for successively numbering the marks of said measuring scale dependent on the relative displacement between the latter and said counter, ten shafts rotating said counters, a rotatable disk supporting said counters, an assembly of transmission gears coupling said rack with said rotatable disk, a driving gear for rotating said shafts of said counters on said rotatable disk, a second assembly of transmission gears coupling said rack with said driving gear, the angular speed of said driving gear being unequal to the angular speed of said disk, and for resetting to zero said counters independently of said scale and said rack, the angular speed of said disk being equal to the angular speed of the shafts of said counters, and a reading device comprising a reading window, projection means for projecting a portion of said scale on said reading window and projection means for projecting numbers of said counters on said reading window, said reading window thus showing a portion of a numbered scale.

6. A combined measuring, numbering and reading device for use with machine tools, comprising, in combination, an unnumbered measuring scale bearing a plurality of marks for measuring lengths, a rack moving together with said scale, ten rotatable counters adapted for successively numbering the marks of said measuring scale dependent on the relative displacement between the latter and said counter, ten shafts rotating said counters, a rotatable disk supporting said counters, an assembly of transmission gears coupling said rack with said rotatable disk, a driving gear for rotating said shafts of said counters on said rotatable disk, a second assembly of transmission gears coupling said rack with said driving gear, the angular speed of said driving gear being unequal to the angular speed of said disk, and means for resetting to zero said counters independently of said scale and said rack, the angular speed of said disk being equal to the angular speed of the shafts of said counters, each of said counters numbering every tenth of said marks of said scale with a number exceeding the preceding number supplied by said counter by one hundred, with the last two index numbers remaining constant, and a reading device comprising a reading window, projection means for projecting a portion of said scale on said reading window and projection means for projecting numbers of said counters on said reading window, said reading window thus showing a portion of a numbered scale.

7. A combined measuring, numbering and reading device for use with machine tools, comprising, in combination, an unnumbered measuring scale bearing a plurality of marks for measuring lengths, means operatively associated with said scale for numbering said marks thereon, said means comprising a rotatable and axially displaceable numbering drum having on its periphery helically disposed figures used for numbering said scale, and a reading device comprising a reading window, projection means for projecting a portion of said scale on said reading window and projection means for projecting numbers of said numbering drum on said reading window, said reading window thus showing a portion of a numbered scale.

8. A combined measuring, numbering and reading device for use with machine tools, comprising, in combination, an unnumbered measuring scale bearing a plurality of marks for measuring lengths, means operatively associated with said scale for numbering said marks thereon, said means comprising a rotatable and axially displaceable numbering drum having on its periphery helically disposed figures used for numbering said scale, said drum being composed of transparent material and being hollow, and a light source arranged in the interior of said drum, and a reading device comprising a reading window, projection means for projecting a portion of said scale on said reading window and projection means for projecting numbers of said numbering drum on said reading window, said reading window thus showing a portion of a numbered scale.

9. A combined measuring, numbering and reading device for use with machine tools, comprising, in combination, an unnumbered measuring scale bearing a plurality of marks for measuring lengths, means operatively associated with said scale for numbering said marks thereon, said means comprising a rotatable and axially displaceable, hollow numbering drum of transparent material, a plastic sheet wound around said drum and bearing helically disposed figures for numbering said scale, and a reading device comprising a reading window, projection means for projecting a portion of said scale on said reading window and projection means for projecting numbers of said numbering drum on said reading window, said reading window thus showing a portion of a numbered scale.

10. A combined measuring, numbering and reading device for use with machine tools, comprising, in combination, an unnumbered measuring scale bearing a plurality of marks for measuring lengths, means for numbering said marks of said scale comprising a rotatable and axially displaceable numbering drum having on its periphery helically disposed figures used for numbering said scale, coupling and transmission means causing said drum to be rotatably and longitudinally displaced whenever said scale is displaced, and a reading device comprising a reading window, projection means for projecting a portion of said scale on said reading window and projection means for projecting numbers of said numbering drum on said reading window, said reading window thus showing a portion of a numbered scale.

11. A combined measuring, numbering and reading device for use with machine tools, comprising, in combination, an unnumbered measuring scale bearing a plurality of marks for measuring lengths, means for numbering said marks of said scale comprising a rotatable and axially displaceable, hollow numbering drum of transparent material, a plastic sheet wound around said drum and bearing helically disposed figures for numbering said scale, said drum having an internally threaded portion at its one end and a protruding portion at its other end, an externally threaded, stationary sleeve engaging said threaded portion of said drum, coupling and transmission means between said drum and said scale causing said drum to rotate whenever said scale is displaced comprising a rack, a worm gear, a slide clutch and an intermediate sleeve having a longitudinal guide slot, said drum revolving around said threaded stationary sleeve and thus being forced to move longitudinally, with the protruding portion of said drum travelling in said guide slot of said intermediate sleeve, and a reading device comprising a reading window, projection means for projecting a portion of said scale on said reading window and projection means for projecting numbers of said numbering drum on said reading window, said reading window thus showing a portion of a numbered scale.

12. A combined measuring, numbering and reading device for use with machine tools, comprising, in combination, an unnumbered measuring scale bearing a plurality of marks for measuring lengths, means for numbering said marks of said scale comprising a rotatable and axially displaceable, hollow numbering drum of transparent material, a plastic sheet wound around said drum and bearing helically disposed figures for numbering said scale, said drum having an internally threaded portion at its one end and a protruding portion at its other end, an externally threaded, rotatable sleeve engaging said threaded portion of said drum, locking means for arresting said threaded sleeve, coupling and transmission means between said drum and said scale causing said drum to rotate whenever said scale is displaced comprising a rack, a worm gear, a slide clutch and an intermediate sleeve having a longitudinal guide slot, said drum revolving around said threaded sleeve, while said sleeve is arrested by said locking means and thus being forced to move longitudinally, with the protruding portion of said drum travelling in said guide slot of said intermediate sleeve, means for rotating said threaded sleeve, and a reading device comprising a reading window, projection means for projecting a portion of said scale on said reading window and projection means for projecting numbers of said numbering drum on said reading window, said reading window thus showing a portion of a numbered scale.

13. A combined measuring, numbering and reading device as described in claim 11, comprising means for resetting to zero said drum independently from the position of said measuring scale relative thereto.

14. A combined measuring, numbering and reading device as described in claim 12, with the pitch of the threadings of said threaded sleeve being in the order of one millimeter.

15. A combined measuring, numbering and reading device as described in claim 12, said drum performing one full rotation whenever said scale is longitudinally displaced by the amount of one meter.

16. A combined measuring, numbering and reading device as described in claim 12, said scale being divided into centimeters.

17. A combined measuring, numbering and reading device as described in claim 12, with the number of threads of said threaded sleeve being in the order of thirty.

References Cited in the file of this patent

UNITED STATES PATENTS

| | | |
|---|---|---|
| 905,441 | Lenker | Dec. 1, 1908 |
| 2,497,981 | De Gramont | Feb. 21, 1950 |